US012770538B2

(12) United States Patent
Miyazawa

(10) Patent No.: US 12,770,538 B2
(45) Date of Patent: Oct. 20, 2026

(54) VEHICLE DISPLAY DEVICE

(71) Applicant: YAZAKI CORPORATION, Tokyo (JP)

(72) Inventor: Tomohiro Miyazawa, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 18/807,874

(22) Filed: Aug. 16, 2024

(65) Prior Publication Data

US 2025/0078695 A1 Mar. 6, 2025

(30) Foreign Application Priority Data

Aug. 30, 2023 (JP) ................................ 2023-140088

(51) Int. Cl.

*G09G 3/00* (2006.01)
*B60K 35/23* (2024.01)
*B60K 35/28* (2024.01)
*G02B 27/01* (2006.01)

(52) U.S. Cl.

CPC ............ *G09G 3/001* (2013.01); *B60K 35/23* (2024.01); *B60K 35/285* (2024.01); *G02B 27/0101* (2013.01); *B60K 2360/182* (2024.01); *G02B 2027/0132* (2013.01); *G02B 2027/0141* (2013.01); *G09G 2340/045* (2013.01); *G09G 2340/0464* (2013.01); *G09G 2380/10* (2013.01)

(58) Field of Classification Search

None

See application file for complete search history.

(56) References Cited

U.S. PATENT DOCUMENTS

2014/0236483 A1* 8/2014 Beaurepaire ....... G01C 21/3685 701/533
2019/0137770 A1* 5/2019 Huang .................... G06F 3/011
2021/0306618 A1* 9/2021 Sugiyama ............ H04N 13/398
2023/0022485 A1* 1/2023 Fujita ..................... G09G 3/002

FOREIGN PATENT DOCUMENTS

JP 3412285 B2 * 6/2003 ............ B60K 35/00
JP 2016-130771 A 7/2016

* cited by examiner

*Primary Examiner* — Christopher R Lamb

(74) *Attorney, Agent, or Firm* — KENEALY VAIDYA LLP

(57) ABSTRACT

A vehicle display device including an image display unit, an optical system and a control unit is provided. An image includes a both-eye region that is a region visually recognized by both eyes of the driver and a one-eye region that is a region visually recognized by only one eye of the driver. When displaying a direction design for notifying a direction, the control unit displays the direction design across the both-eye region from the one-eye region.

4 Claims, 6 Drawing Sheets

VEHICLE DISPLAY DEVICE

CROSS-REFERENCE TO RELATED APPLICATIONS

This application is based on and claims priority under 35 USC 119 from Japanese Patent Application No. 2023-140088 filed on Aug. 30, 2023, the contents of which are incorporated herein by reference.

TECHNICAL FIELD

The present disclosure relates to a vehicle display device.

BACKGROUND ART

In the related art, there is known a vehicle display device such as a head-up display for visually recognizing an image as a virtual image from positions of eyes (eyepoint) of a driver. For example, Patent Literature 1 describes a display device having improved visibility of an image by making luminance of a one-eye region that is visually recognizable only by one eye higher than luminance of a both-eye region that is visually recognizable by both eyes.

CITATION LIST

Patent Literature

Patent Literature 1: JP2016-130771A

SUMMARY OF INVENTION

The present disclosure is made in view of the above circumstance, and an object of The present disclosure is to provide a vehicle display device by which a driver can easily notice display of a design even when the design is displayed in a one-eye region.

To achieve the above object, the vehicle display device according to The present disclosure has following features.

The vehicle display device includes an image display unit that emits display light for an image; an optical system that projects the display light emitted from the image display unit toward a reflecting surface in front of a driver; and a control unit that controls the image display unit. The image includes a both-eye region that is a region visually recognized by both eyes of the driver and a one-eye region that is a region visually recognized by only one eye of the driver. When displaying a direction design for notifying a direction, the control unit displays the direction design across the both-eye region from the one-eye region.

According to The present disclosure, it is possible to provide a vehicle display device by which a driver can easily notice display of a design even when the design is displayed in a one-eye region.

The present disclosure is briefly described above. Details of The present disclosure can be clarified by reading a mode (hereinafter, referred to as "embodiment") for carrying out the invention to be described below with reference to the accompanying drawings.

DESCRIPTION OF EMBODIMENTS

A specific embodiment of The present disclosure will be described below with reference to the drawings.

Figure 1:
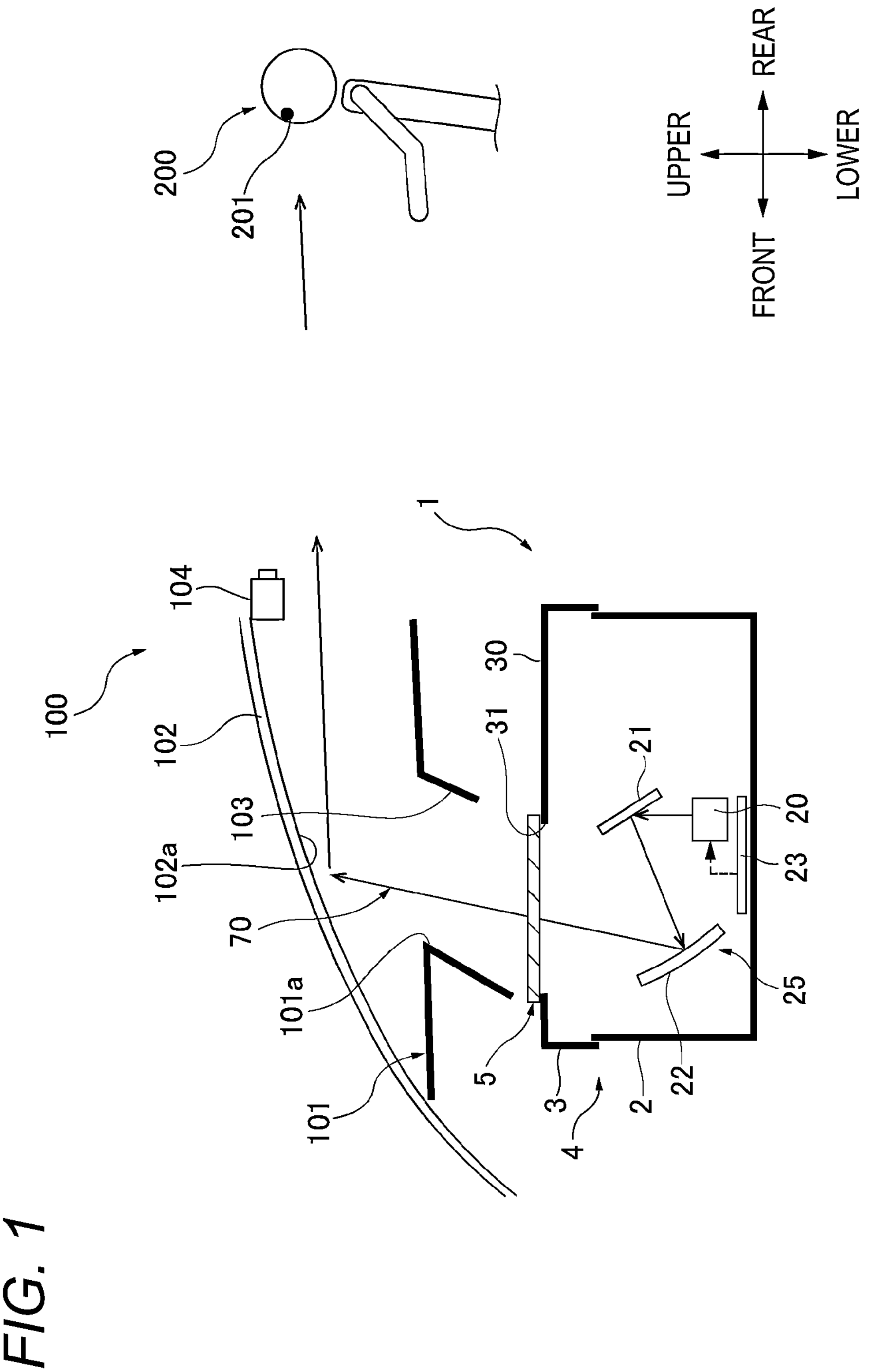
FIG. 1 is a schematic configuration diagram showing a vehicle display device according to an embodiment.
Figure 2:
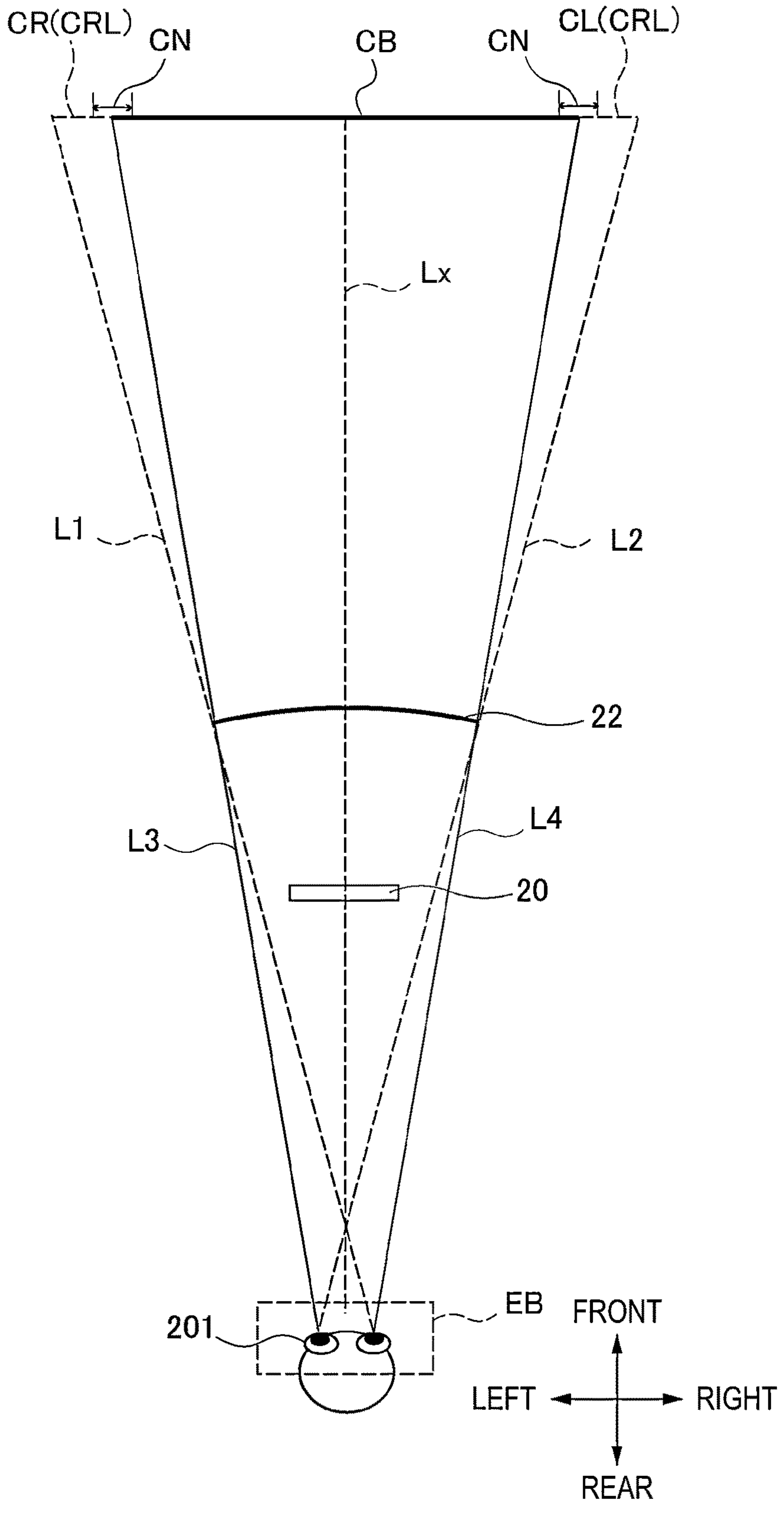
FIG. 2 shows an optical positional relationship among a virtual image, a second mirror, and eyes of a driver when the eyes of the driver are located in a center of an eye box in a left-right direction.

Hereinafter, for convenience of description, "front", "rear", "left", "right", "upper", and "lower" are defined as shown in FIGS. 1 and 2. A "front-rear direction", a "left-right direction", and an "upper-lower direction" are orthogonal to one another. The left-right direction corresponds to a "horizontal direction" of The present disclosure.

As shown in FIG. 1, a vehicle display device 1 of the present embodiment is mounted on a vehicle 100 and constitutes a head-up display. The vehicle display device 1 is disposed, for example, inside an instrument panel 101. The instrument panel 101 has an opening 101*a* that opens upward. The opening 101*a* faces a windshield 102 in the upper-lower direction of the vehicle 100.

The vehicle display device 1 includes a case 4, a cover 5, an image display unit 20, a control unit 23, and an optical system 25. The image display unit 20, the control unit 23, and the optical system 25 are accommodated inside the case 4. The case 4 includes a body 2 and a lid member 3 that engages with the body 2. The body 2 has an opening that opens upward. The lid member 3 closes the opening of the body 2 from above. The lid member 3 includes a wall portion 30 that faces the opening 101*a*. The wall portion 30 has an opening 31 that opens upward. The case 4 is disposed such that the opening 31 faces the opening 101*a*. The cover 5 is a plate-shaped member that closes the opening 31 of the lid member 3. The cover 5 is formed of a light-transmissive resin such as polycarbonate (PC) and acrylic.

The image display unit 20 is a device that emits display light 70 for an image. The shown image display unit 20 is a liquid crystal display device, and is, for example, a thin film transistor liquid crystal display (TFT-LCD). However, the image display unit 20 is not limited to the liquid crystal display device. The image display unit 20 may be, for example, a device that generates an image on a transmissive screen by scanning the screen with laser light.

The optical system 25 includes a first mirror 21 and a second mirror 22. The first mirror 21 reflects the display light 70 emitted from the image display unit 20 toward the second mirror 22. The first mirror 21 is, for example, a plane mirror. The second mirror 22 reflects the display light 70 toward the windshield 102. A shape of a reflecting surface of the second mirror 22 is, for example, a free-form surface. The second mirror 22 is, for example, a concave mirror that enlarges the display light 70.

The display light 70 reflected by the second mirror 22 passes through the opening 31 and the opening 101*a*, and is reflected toward a driver 200 by a reflecting surface 102*a* of the windshield 102. A virtual image is formed by the display light 70 incident on eyes 201 of the driver 200. The instrument panel 101 is provided with a tubular wall portion 103. The wall portion 103 surrounds an optical path of the display light 70 from the opening 31 toward the opening 101*a*.

As shown in FIG. 2, an image displayed on the image display unit 20 to the driver 200 as a virtual image includes a both-eye region CB that is a region visually recognized by both eyes of the driver 200, a right-eye region CR that is a region not visually recognized by the left eye and only visually recognized by the right eye, and a left-eye region CL that is a region not visually recognized by the right eye and only visually recognized by the left eye. The right-eye region CR and the left-eye region CL are regions on end portion sides in the left-right direction relative to the both-eye region CB. Hereinafter, the right-eye region CR and the left-eye region CL are also collectively referred to as "one-eye region CRL".

Figure 3:
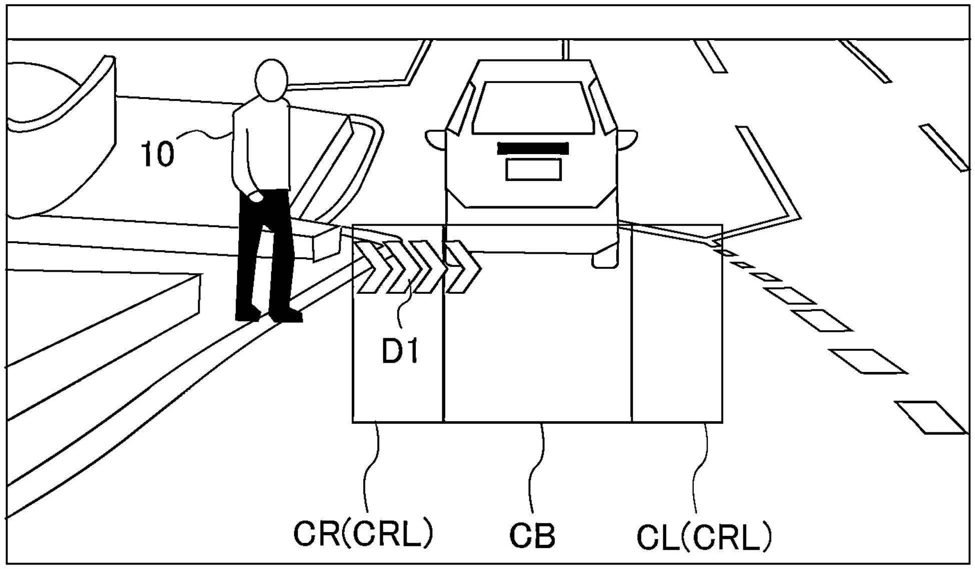
FIG. 3 shows arrangements of regions of a virtual image visually recognized by the driver.

FIG. 3 shows arrangements of regions of a virtual image superimposed on a foreground of the driver 200. As shown in FIG. 3, a left end region of the virtual image corresponds to the right-eye region CR, a central region of the virtual image corresponds to the both-eye region CB, and a right side region of the virtual image corresponds to the left-eye region CL.

The control unit 23 includes a control circuit that controls the image display unit 20. The control unit 23 is mounted on, for example, a control substrate disposed inside the case 4. The control unit 23 controls the image display unit 20 according to, for example, a program stored in advance to generate an image.

The vehicle 100 includes a driver monitor 104. The driver monitor 104 includes a camera disposed in front of the driver 200. The driver monitor 104 images the driver 200 and generates a driver image. The driver monitor 104 detects a position of a head of the driver 200 and positions of the eyes 201 (viewpoint positions) of the driver 200 based on the driver image. A detection result by the driver monitor 104 is sent to the control unit 23.

The control unit 23 sets the both-eye region CB and the one-eye region CRL (see FIG. 2) on a display screen of the image display unit 20, and changes luminance between the both-eye region CB and the one-eye region CRL. As shown in FIG. 3, when detecting an approaching object 10, the control unit 23 displays a direction design D1, which notifies an approaching direction of the approaching object 10, across the both-eye region CB from the one-eye region CRL. In the example shown in FIG. 3, a pedestrian that is the approaching object 10 approaches the vehicle 100 from left to right. For this reason, the control unit 23 displays the direction design D1, which notifies a direction from left to right, across the both-eye region CB from the right-eye region CR located on a left side of the both-eye region CB. When the approaching object 10 approaches from right to left of the vehicle 100, the control unit 23 displays the direction design D1, which notifies a direction from right to left, across the both-eye region CB from the left-eye region CL located on a right side of the both-eye region CB.

Thereafter, details of the both-eye region CB and the one-eye region CRL will be described with reference to FIG. 2. FIG. 2 shows an optical positional relationship among a virtual image, a second mirror, and the eyes 201 of the driver 200. The positions of the eyes 201 shown in FIG. 2 are central positions of an eye box EB in the left-right direction. The eye box EB is a range assumed in advance as a range in which the positions of the eyes 201 move. The eye box EB has a prescribed width in the left-right direction. The vehicle display device 1 is configured such that an image can be visually recognized from the driver 200 when the eyes 201 are inside the eye box EB.

When light reflected by an entire surface of the second mirror 22 is visually recognized, as shown in FIG. 2, a left end position of the right-eye region CR is on an extension of a light beam "L1" connecting the right eye of the driver 200 and a left end position of the second mirror 22. A right end position of the left-eye region CL is on an extension of a light beam "L2" connecting the left eye of the driver 200 and a right end position of the second mirror 22. The driver 200 cannot visually recognize the left end position of the right-eye region CR with the left eye, and cannot visually recognize the right end position of the left-eye region CL with the right eye.

A left end position of the both-eye region CB is on an extension line of a configuration "L3" connecting the left eye of the driver 200 and a left position of the second mirror 22. A right end position of the both-eye region CB is on an extension line of a configuration "L4" connecting the right eye of the driver 200 and a right position of the second mirror 22.

As is clear from FIG. 2, when the viewpoint positions of the driver 200 are in the central positions of the eye box EB in the left-right direction, the both-eye region CB, the right-eye region CR, and the left-eye region CL can be set based on an interval between both eyes of the driver 200 and an arrangement position of the optical system 25.

Figure 4:
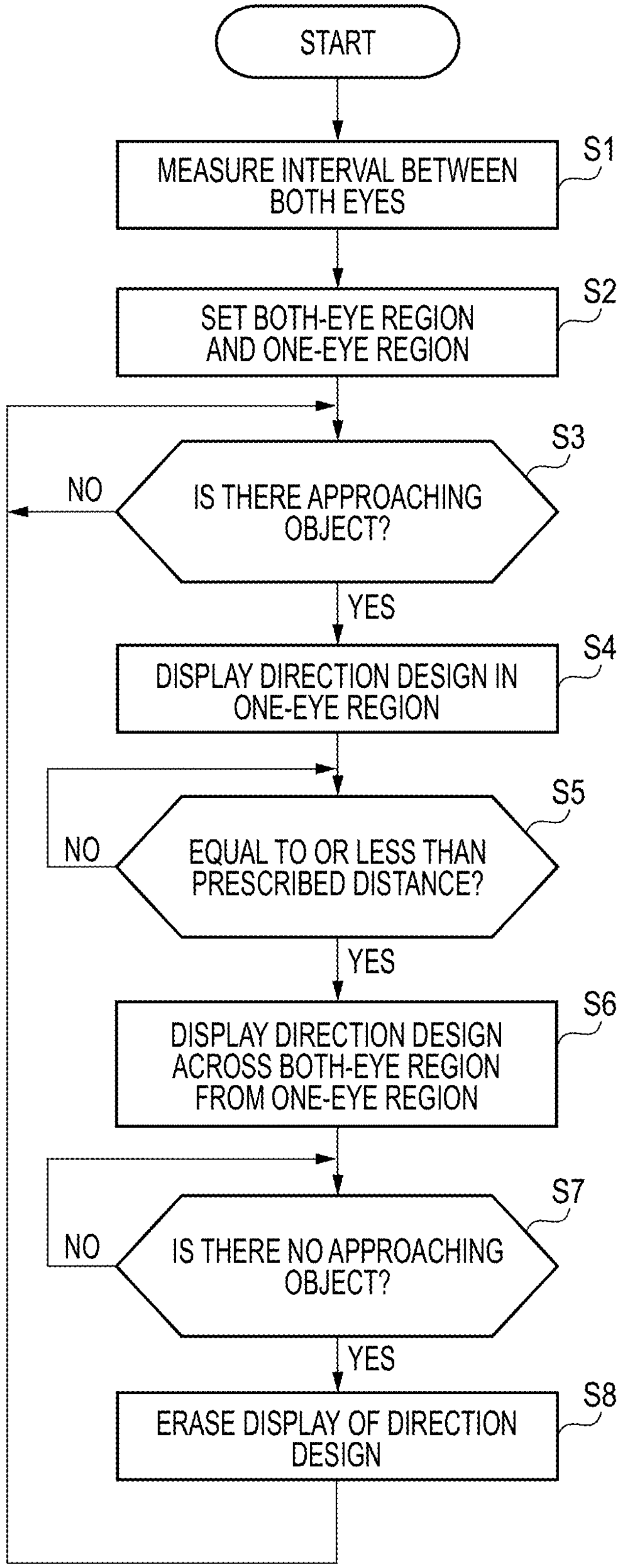
FIG. 4 is a flowchart showing operation of a control unit constituting the vehicle display device shown in FIG. 1.

Thereafter, the operation of the control unit 23 described in the above outline will be described with reference to a flowchart in FIG. 4. First, the control unit 23 measures an interval between both eyes of the driver 200 based on a driver image from the driver monitor 104 (S1).

Thereafter, the control unit 23 sets the both-eye region CB and the one-eye region CRL on the display screen of the image display unit 20 when the eyes 201 of the driver 200 are in the central positions of the eye box EB in the left-right direction based on the measured interval between both eyes and a known arrangement position of the optical system 25 (S2).

Figure 5:
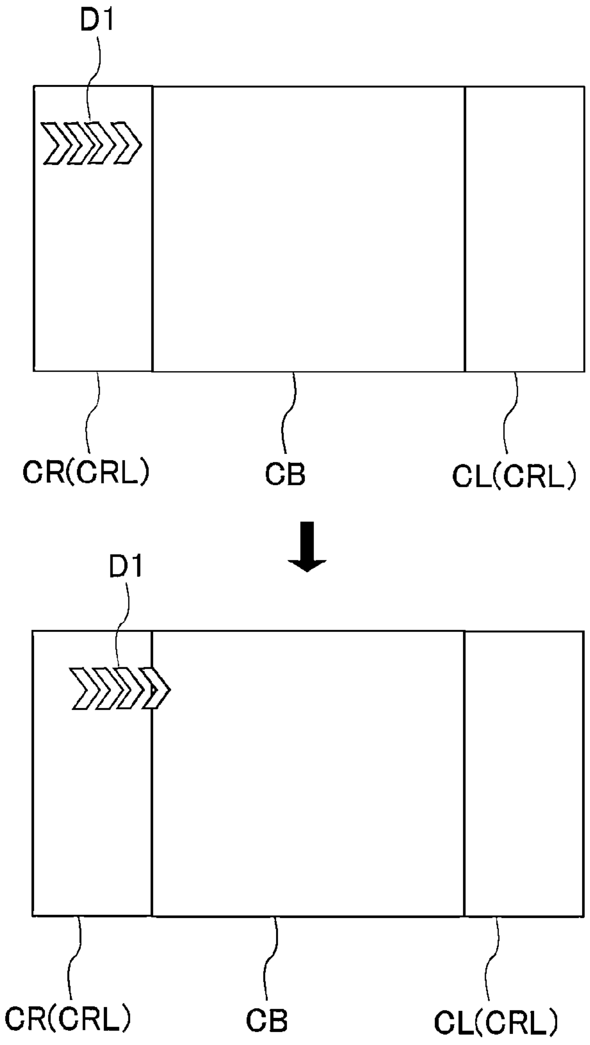
FIG. 5 shows an example of a virtual image visually recognized by the driver.
Figure 6:
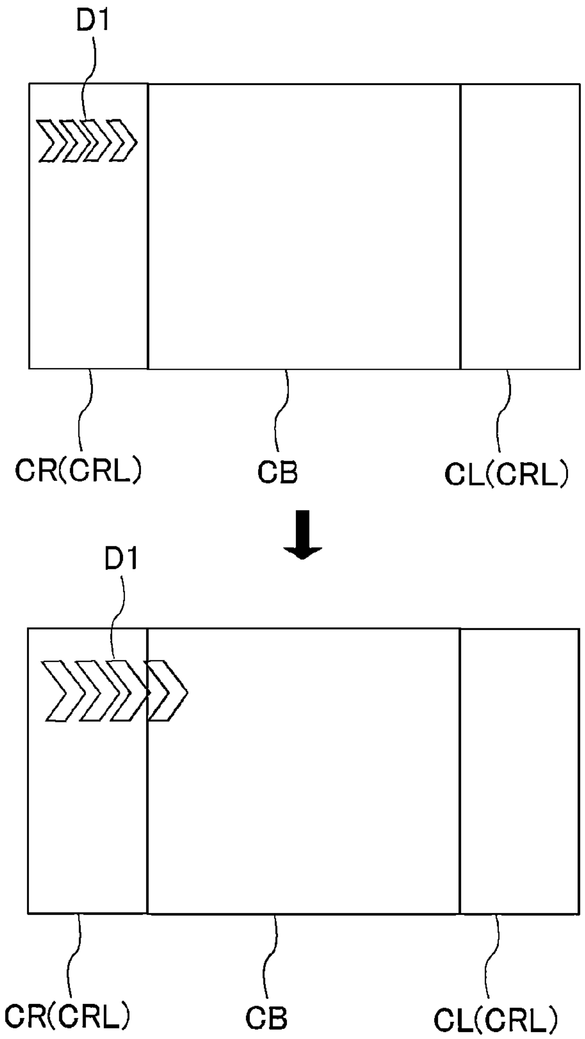
FIG. 6 shows an example of a virtual image visually recognized by the driver.

When the approaching object 10 is detected from a detection result of a vehicle surroundings monitoring device (Y in S3), the control unit 23 displays the direction design D1 only in the one-eye region CRL as shown on an upper side of FIGS. 5 and 6 (S4). Thereafter, when a distance to the approaching object 10 is equal to or less than a prescribed distance and a probability of collision with the approaching object 10 increases (Y in S5), the control unit 23 displays the direction design D1 across the both-eye region CB from the one-eye region CRL as shown on a lower side of FIGS. 5 and 6 (S6).

In S6, as shown in FIG. 5, the control unit 23 may shift a position of the direction design D1 displayed only in the one-eye region CRL toward the both-eye region CB and display the direction design D1 across the both-eye region CB from the one-eye region CRL. As shown in FIG. 6, the control unit 23 may also increase a size of the direction design D1 and display the direction design D1 across the both-eye region CB from the one-eye region CRL.

At this time, the control unit 23 may display the direction design D1 that changes with time in a flowing or blinking manner.

Thereafter, the control unit waits until the approaching object 10 is no longer detected (Y in S7), and returns to S3 after erasing the display of the direction design D1 (S8).

When notifying a direction, particularly, the left-right direction, displaying the direction in the one-eye region CRL corresponding to the direction to be notified instead of displaying the direction only in the both-eye region CB makes the driver 200 easier to recognize the direction. According to the embodiment described above, when displaying the direction design D1 notifying the direction, the control unit 23 displays the direction design D1 across the both-eye region CB from the one-eye region CRL. Accordingly, the driver 200 is easy to notice the display of the direction design D1 even when the direction design D1 is desired to be displayed in the one-eye region CRL.

According to the embodiment described above, the control unit 23 displays the direction design D1 only in the one-eye region when the distance to the approaching object 10 is larger than the prescribed distance, and displays the direction design D1 across the both-eye region CB from the one-eye region CRL by changing a position or a size of the direction design D1 when the distance to the approaching object 10 is equal to or smaller than the prescribed distance. Accordingly, the driver 200 can reliably know the approaching direction when the distance to the approaching object 10 is equal to or less than the prescribed distance and the probability of collision increases.

According to the embodiment described above, the direction design D1 is a design that changes with time and is displayed in a flowing or blinking manner. For this reason, even when the direction design D1 is displayed across the both-eye region CB and the one-eye region CRL, an uncomfortable feeling can be reduced.

The present disclosure is not limited to the embodiment described above and can be appropriately modified, improved and the like. Materials, shapes, sizes, numbers, arrangement positions, and the like of components in the embodiment described above are freely selected and are not limited as long as The present disclosure can be implemented.

According to the above-described embodiment, the control unit 23 sets the both-eye region CB and the one-eye region CRL when the eyes are in a center of the eye box EB in the left-right direction. Alternatively, The present disclosure is not limited thereto. The both-eye region CB and the one-eye region CRL are on a left side when the eyes 201 are on a right side of the eye box EB, and are on the right side when the eyes 201 are on the left side of the eye box EB. The control unit 23 may periodically measure the positions of the eyes 201 (sightline position) and reset the both-eye region CB and the one-eye region CRL set according to the positions of the eyes 201.

The embodiment described above described a case in which the light reflected by the entire surface of the second mirror 22 is visually recognized by the driver 200. Alternatively, The present disclosure is not limited thereto. For example, an image may be cut off by the lid member 3. In this case, the both-eye region CB and the one-eye region CRL are determined by lines connecting the eyes 201 of the driver 200 and a right end position and a left end position of the opening 31 of the lid member 3.

In the above-described embodiment, the control unit 23 measures the interval between both eyes based on the driver image, and sets the both-eye region CB, the one-eye region CRL, and a non-display region CN based on the measured interval between both eyes. The control unit 23 may set the both-eye region CB, the one-eye region CRL, and the non-display region CN based on a predetermined average interval between both eyes without measuring the interval between both eyes.

According to the embodiment described above, the direction design D1 is a design notifying the approaching direction of the approaching object 10, and The present disclosure is not limited thereto. The direction design D1 may notify a direction of right turn and left turn or a direction of a lane change instruction of a navigation device.

According to the above-described embodiment, the control unit 23 displays the direction design D1 only in the one-eye region CRL when the distance to the approaching object 10 is larger than the prescribed distance, and displays the direction design D1 across the both-eye region CB from the one-eye region CRL when the distance to the approaching object 10 is equal to or smaller than the prescribed distance. Alternatively, The present disclosure is not limited thereto. When the approaching object 10 is detected, the control unit 23 may display the direction design D1 across the both-eye region CB from the one-eye region CRL regardless of the distance to the approaching object 10.

The control unit 23 may not display the direction design D1 in a boundary region between the one-eye region CRL and the both-eye region CB. An image displayed across the one-eye region CRL and the both-eye region CB tends to give the driver 200 an uncomfortable feeling. For example, in a case of the direction design D1 in which a plurality of arrow tip designs are arranged side by side at intervals as in the present embodiment, when the direction design D1 is displayed such that the boundary region is located between two arrow tip designs, the uncomfortable feeling to the driver 200 can be reduced.

Here, features of the embodiment of the vehicle display device according to The present disclosure described above are briefly summarized and listed in following [1] to [4].

[1] A vehicle display device (1) includes:

an image display unit (20) configured to emit display light (70) for an image;

an optical system (25) configured to project the display light (70) emitted from the image display unit (20) toward a reflecting surface in front of a driver (200); and a control unit (23) configured to control the image display unit (20), wherein the image includes a both-eye region (CB) that is a region visually recognized by both eyes of the driver (200) and a one-eye region (CRL) that is a region visually recognized by only one eye of the driver (200), and when displaying a direction design (D1) for notifying a direction, the control unit (23) displays the direction design (D1) across the both-eye region (CB) from the one-eye region (CRL).

According to the configuration of [1], when displaying the direction design (D1) notifying the direction, the control unit (23) displays the direction design (D1) across the both-eye region (CB) from the one-eye region (CRL). Accordingly, the driver (200) is easy to notice the display of the direction design (D1) even when the direction design (D1) is desired to be displayed in the one-eye region (CRL).

[2] In the vehicle display device (1) according to [1], when detecting a vehicle approaching object (10), the control unit (23) displays the direction design (D1) notifying an approaching direction of the approaching object (10) across the both-eye region (CB) from the one-eye region (CRL).

According to the configuration of [2], the driver (200) is easy to notice the display of the direction design (D1) notifying the approaching direction of the approaching object (10).

[3] In the vehicle display device (1) according to [2], the control unit (23) displays the direction design (D1) only in the one-eye region (CRL) when a distance to the approaching object (10) is larger than a prescribed distance, and displays the direction design (D1) across the both-eye region (CB) from the one-eye region (CRL) by changing a position or a size of the direction design (D1) when the distance to the approaching object (10) is equal to or smaller than the prescribed distance.

According to the configuration of [3], the driver (200) can reliably know the approaching direction when the distance to the approaching object (10) is equal to or less than the prescribed distance and the probability of collision increases.

[4] In the vehicle display device (1) according to [1], the direction design (D1) is a design that changes with time.

According to the configuration of [4], since the direction design (D1) is a design that changes with time, an uncomfortable feeling can be reduced even when the direction design (D1) is displayed across the both-eye region (CB) and the one-eye region (CRL).

What is claimed is:

1. A vehicle display device comprising:

an image display unit that emits display light for an image;

an optical system that projects the display light emitted from the image display unit toward a reflecting surface in front of a driver of a vehicle; and controller that is configured to control the image display unit, wherein the image includes a both-eye region that is a region visually recognized by both eyes of the driver and a one-eye region that is a region visually recognized by only one eye of the driver, and the controller is configured to:

detect a moving object that is traveling along an object path that intersects a travel path of the vehicle;

control the image display unit to display a direction design for notifying a direction in only in the one-eye region in response to detecting an approaching the moving object; and if displaying the direction design only in the one-eye region, control the image display unit to extend the direction design from within the one-eye region and into the both-eye region if a distance to the moving object is equal to or smaller than a prescribed distance; and if extending the direction design from within the one-eye region and into the both-eye region and the distance to the moving object is equal to or smaller than the prescribed distance, control the image display unit to maintain the direction design extending from within the one-eye region and into the both-eye region.

2. The vehicle display device according to claim 1, wherein when detecting the moving object, the controller displays the direction design notifying an approaching direction of the moving object across the both-eye region from the one-eye region.

3. The vehicle display device according to claim 2, wherein when a distance to the moving object is larger than a prescribed distance, the controller displays the direction design only in the one-eye region, and when the distance to the moving object is equal to or smaller than the prescribed distance, the controller displays the direction design across the both-eye region from the one-eye region by changing a position or a size of the direction design.

4. The vehicle display device according to claim 1, wherein the direction design is a design that changes with time.

* * * * *